United States Patent
Shulga et al.

(10) Patent No.: US 9,527,992 B2
(45) Date of Patent: Dec. 27, 2016

(54) COMPOSITION FOR 3D PRINTING

(71) Applicant: CREOPOP PTE. LTD., The Central Singapore (SG)

(72) Inventors: Anna Shulga, Tomsk (RU); Igor Kovalev, Tomsk (RU); Dmitry Starodubtsev, Tomsk (RU)

(73) Assignee: CREOPOP PTE. LTD., The Central Singapore (SG)

(*) Notice: Subject to any disclaimer, the term of this patent is extended or adjusted under 35 U.S.C. 154(b) by 119 days.

(21) Appl. No.: 14/536,729

(22) Filed: Nov. 10, 2014

(65) Prior Publication Data

US 2016/0060449 A1 Mar. 3, 2016

Related U.S. Application Data

(60) Provisional application No. 62/043,754, filed on Aug. 29, 2014.

(51) Int. Cl.
| | |
|---|---|
| *C08L 35/02* | (2006.01) |
| *H01F 1/01* | (2006.01) |
| *H01B 1/20* | (2006.01) |
| *B33Y 70/00* | (2015.01) |
| *C09D 4/06* | (2006.01) |
| *B29C 67/00* | (2006.01) |

(52) U.S. Cl.
CPC ............ *C08L 35/02* (2013.01); *B29C 67/0055* (2013.01); *B33Y 70/00* (2014.12); *C09D 4/06* (2013.01); *H01B 1/20* (2013.01); *H01F 1/01* (2013.01)

(58) Field of Classification Search
CPC ............. C08L 35/02; H01B 1/20; H01B 1/01; B33Y 70/00; B29C 67/0055; C09D 4/06; H01F 1/01

See application file for complete search history.

(56) References Cited

U.S. PATENT DOCUMENTS 9,138,981 B1 * 9/2015 Hirsch .................. B33Y 70/00

FOREIGN PATENT DOCUMENTS

| CN | 103755889 | 4/2014 |
|---|---|---|
| EP | 2277686 | 1/2011 |
| TW | 2011491969 | 1/2011 |
| WO | WO2013043908 | 3/2013 |
| WO | WO2014077848 | 5/2014 |

* cited by examiner

*Primary Examiner* — Michael Pepitone
*Assistant Examiner* — Jessica Roswell
(74) *Attorney, Agent, or Firm* — TransPacific Law Group; Pavel I. Pogodin, Esq.

(57) ABSTRACT

The present invention relates to polymer compositions suitable for 3D printing. The composition comprises 60 to 80 mass % of oligoester acrylate; 10 to 30 mass % of a liquid polyethylene glycol; 7 to 9 mass % of a non-liquid polyethylene glycol; and 0.1 to 1 mass % of a system of photopolymerization initiators. A distinguishing feature of the composition is that after being extruded at an environment temperature of 22° C. with the extrusion rate of 2.5 to 3.5 cm/sec through a nozzle of a hand-held 3D printing device having an output orifice with a diameter in the range of 0.6 to 1.5 mm and after being irradiated after extrusion with a light having a wavelength in the range of 390 to 410 nm by LEDs having a total power of 2 Wt, the composition maintained its shape without a support.

20 Claims, No Drawings

COMPOSITION FOR 3D PRINTING

BACKGROUND OF THE INVENTION

Field of the Invention

This invention relates to polymer compositions and more specifically to liquid photopolymerizable compositions suitable for 3D printing. More specifically, the invention relates to a pasty 3D printing composition for use in conjunction with a hand-held, self-contained 3D printing device such as a 3D printing pen.

Three-dimensional printing (hereinafter referred to as 3D printing) is a printing process used for making three-dimensional solid prototypes, e.g., from digital models. In general, 3D printing technique is considered an additive process because it involves the application of sequential layers of material. Materials used in 3D printing often require curing or fusing, which for some materials may be accomplished by heat-assisted extrusion or sintering. Materials for 3D printing may be used in a solid, powdered or liquid form with supports for supporting the extruded material or without supports. In case the material is extruded into a three-dimensional space without supports the main requirement is that at the exit from the 3D printer the material should be precured to a condition at which it can maintain its shape. Curing may be carried out by heating or by radiation energy such as UV radiation if the material is photopolymerizable.

International Patent Application Publication WO 2013043908 A1 published on Mar. 28, 2013 discloses powder compositions that can be used with traditional 3D printing technology and methods for producing 3D printed building materials that have comparable compressive strength to standard concrete and tensile strength up to 70% greater than standard concrete. The powder composition for 3D printing, comprises: (a) approximately 0.75 to approximately 2.0 parts by weight of an adhesive material; (b) approximately zero to approximately 2.0 parts by weight of an absorbent material; and (c) approximately 4.0 to approximately 6.0 parts by weight of a base material. The adhesive material is selected from the group of materials consisting of: powdered sugar, poly-vinyl alcohol (PVA) adhesive, polyureic formaldehyde adhesive, wheat paste, methyl cellulose, powdered wood glue and water putty.

European Patent Application Publication EP2277686A2 published on Jan. 26, 2011 discloses compositions for use in the manufacture of 3-D objects including compositions for use as a support and/or release material in the manufacture of the 3-D objects. The compositions comprise at least one reactive component, at least one photo-initiator, at least one surface-active agent and at least one stabilizer. The compositions for use as a support and/or release material comprise at least one nonreactive and low-toxicity compound, at least one surface-active agent, at least one stabilizer and optionally at least one reactive component and at least one photo-initiator. Methods for manufacturing a 3-D object using the compositions of the present invention are also provided.

International Patent Application Publication WO2014077848 (A1) published on May 22, 2014 discloses a composition for 3D printing that includes a liquid, curable, cross-linkable monomer, solid thermoplastic particles mixed with the liquid, curable, cross-linkable monomer, and a light sensitive initiator mixed with the liquid, curable, cross-linkable monomer. The solid thermoplastic particles have a size ranging from about 200 nm to about 50 µm.

Chinese Patent Application Publication CN103755889 (A) published on Apr. 30, 2014 discloses a light-emitting high precision three-dimensionally molded photosensitive resin composition which comprises the following components: epoxy resin, acrylic resin, a vinyl ether monomer, an acrylate monomer, a free radical photoinitiator, a cationic photoinitiator, high temperature resistant ceramic filler, a flatting agent, a defoamer and a photoluminescent organic compound. The photosensitive resin composition can be used for 3D printing, particularly 3D printing of SLA (Stereo Lithography Appearance).

Taiwanese Patent Application Publication TW201141969 (A) discloses a coating composition that comprises polyester polyol resin of 35 to 55 wt %, toluene of 5 to 20 wt %, butyl acetate of 30 to 45 wt % and methyl isobutyl ketone of 3 to 15 wt %. This coating composition can be directly coated on the surface of a workpiece by printing method to form a 3D pattern or texture with elastic touch feeling, thereby simplifying the processing procedure for the surface of workpiece, increasing the touch feeling of surface of workpiece and making the pattern or texture on the surface of workpiece meet customerized requirements.

European Patent Application Publication EP1705228 (A1) published on Sep. 27, 2006 discloses curable compositions for continuous inkjet printing and methods for using these compositions. The composition comprises: a component A in an amount in the range of from 1-15 wt % which component has a dielectric constant larger than 15 (at 0° C.), an ionically dissolved lipophilic salt in an amount in the range of from 1-15 wt %, optionally a coating additive in an amount of at most 10 wt %, and for the remaining part a liquid component B which comprises a curable monomer and/or a curable oligomer, which liquid component B has a viscosity in the range of from 5 to 2000 mPa at inkjet printing temperatures, whereby liquid components A and B are compatible with each other, and all amounts are based upon total composition. The curable monomer is chosen from the group consisting of methacrylates, acrylates, epoxies, oxetanes, epoxy/acid combinations, epoxy/amine combinations, vinyl derivatives, maleimides, and allyl derivatives, and mixtures thereof.

However, none of the curable compositions described is intended specifically for filling a cartridge of a hand-held, self-contained 3D printing device such as a 3D printing pen, handle, or the like.

SUMMARY OF THE INVENTION

The present invention relates to polymer compositions and more specifically to liquid photopolymerizable compositions suitable for 3D printing. More specifically, the invention relates to a pasty 3D printing composition for use in conjunction with a hand-held, self-contained 3D printing device such as a 3D printing pen.

The composition comprises 60 to 80 mass % of oligoester acrylate; 10 to 30 mass % of a liquid polyethylene glycol; 7 to 9 mass % of a non-liquid polyethylene glycol; and 0.1 to 1 mass % of a system of photopolymerization initiators.

The oligoester acrylate comprises a dimethacrylic ester of triethylelene glycol which is a non-toxic homogenous transparent liquid soluble in organic solvents and insoluble in water.

The liquid polyethylene glycol comprises a liquid, which is non-volatile at room temperature and is selected from the group consisting of polyethylene glycols with molecular weights in the range of 200 to 600. The non-liquid polyethylene glycol is one having a molecular weight in the range of 600 to 6000.

A distinguishing feature of the composition of the invention is that after being extruded at an environment temperature of about 22° C. with the extrusion rate of 2.5 to 3.5 cm/sec through a nozzle of a hand-held 3D printing device having an output orifice with a diameter in the range of 0.6 to 1.5 mm and after being irradiated after extrusion with a light having a wavelength in the range of 400 to 450 nm by LEDs having a total power of 2 Wt, the composition maintains its shape without a support.

Within the limits which are not detrimental to the properties of the composition as specified below in the patent claims, the composition may be combined with various additives such as food-coloring agents, a magnetic ferropowders, glittering agents, aromatic agents, and strong electrolytes.

DETAILED DESCRIPTION

The present invention relates to polymer compositions and more specifically to liquid photopolymerizable compositions suitable for 3D printing, in particular for a pasty curable compositions intended for filling a cartridge of a hand-held, self-contained 3D printing device such as a 3D printing pen, handle, or the like.

A 3D printing composition of the invention comprises a pasty basic polymer comprising 60 to 80 mass % of oligoester acrylate, 10 to 30 mass % of a liquid polyethylene glycol (i.e., a polyethylene glycol of low molecular weight), 7 to 9 mass % of a non-liquid polyethylene glycol (i.e., a polyethylene glycol of high molecular weight, and 0.1 to 1 mass % of a system of photopolymerization initiators.

The term "non-liquid" covers pasty and solid polyethylene glycols.

Among the above components, the oligoester acrylates serve as a main filler, which is itself susceptible to photopolymerization, but such a process proceeds very slow and may take up to several hours. Addition of the polyethylene glycol increases the rate of photopolymerization, while the photoinitiators initiate the reaction of photopolymerization.

Examples of oligoester acrylates suitable for the composition of the invention are products of Federal State Unitary Enterprise "Institute of Polymers (Dzerzhinsk, Russia) (types: TMGF-11, MDF-2, MGF-9, and TGM-3). Properties of some of these oligoester acrylates are give below.

Thus, TGM-3-type oligoester acrylate is a dimethacrylic ester of triethylelene glycol which comprises a homogenous transparent liquid. It is produced in two grades: TGM-3 P for manufacturing impregnating compositions, and TGM-3 PT for manufacturing rubber products. TGM-3 is soluble in conventional organic solvents such as toluyene, bexone, acetone, alcohols, as well as in monomers of an acrylic series, etc. It is insoluble in water and is not toxic. Self-ignition temperature is 304° C., flash point is 94° C.

MGF-9 comprises a transparent liquid with a light smell of tolunene. It is produced by condensation-type telomerization from methacrylic acid, triethylene gluycol, and fluoroanhydride. Telomerizarion is a radical polymerization reaction where a chain transfer limits the size of the oligomer molecule product. In the industry, MGF-9 is used as a binder in production of reinforced plastics, protective coatings, construction materials, electrical insulation compounds, lacquers, special glues, and other compounds. Viscosity at 20° C. is 0.01 to 0.22 Pa·s.

Polyethylene glycol (PEG), which, depending on its mean molecular weight, also is known as polyethylene oxide or polyoxyethylene, can be used in different molecular masses such as 200, 300, 400, 600, 1500, 2000, 4000, and 6000 (respective designations are "PEG 200", "PEG 300". "PEG 400", etc).

PEGs with mean molecular weight up to 400 are non-volatile liquids at room temperature. PEG 600 shows a melting range in the range of 17 to 22° C. Therefore, it may be liquid at room temperature and pasty at lower temperatures. PEGs 800 to 2000 are pasty materials with a low melting range. Polyethylene glycols having a mean molecular weight above 3000 are solids and are available as flakes and powders. The most important property of PEGs is their solubility in water which is true even for solid grades. PEG manufacturers are widely distributed over the world. American PEG manufacturers are Linde LLC, NJ; E & C Chemicals, Inc., GA; Continental Chemical USA, FL; Haviland Enterprises, Inc., MI; etc.

Photopolymerization initiators may be selected from the following compounds: phenylbis (2,4,6-trimethylbenzoyl) phosphine, benzoyl peroxide, ferric chloride×$7H_2O$, 2,2-dimethoxy-2-phenylacetophenone, benzoin methyl ether, benzoin butyl ether, benzophenone, acetophenone, 4,4-dichlorobenzophenone, diethoxyacetophenone, 1-hydroxycyclohexyl phenyl ketone, 2-isopropylthioxanthone, oxide bis (2,6-dimethoxybenzoyl, 2,4,4-trimethylpentyl) phosphine, or the like.

The inventors herein have found that the best results for the supply of the 3D printing composition of the invention from a prefilled cartridge could be obtained with the following 3D-printing composition: the oligoester acrylate of RGM-3 type, the photoinitiation system of phenylbis (2,4, 6-trimethylbenozyl) phosphine oxide, benzoyl peroxide, and ferric chloride×$7H_2O$. The use of other components is possible but produces inferior results.

If the oligoester acrylate is added in an amount of less than 60 mass %, this will delay the polymerization reaction and will lead to the formation of a brittle 3D object or model with a rough surface. If, on the other hand, this component is added in an amount exceeding 80 mass %, the polymerization reaction is discontinued at the oligomer stage and will proceed very slow.

If the liquid polyethylene glycol is added in an amount of less than 10 mass %, the polymerization reaction proceeds very slow and may stop at the oligomer state. If the liquid polyethyleneglycol is added in an amount exceeding 30 mass. %, the obtained object or model becomes too brittle.

If solid powdered polyethylene glycol of high molecular weight is added in an amount of less than 7 mass %, the polymerization reaction proceeds very slow and may stop at the oligomer state. If solid powdered polyethylene glycol is added in an amount exceeding 9 mass %, the obtained object or model becomes too brittle.

Although the main components of the composition of the invention, such as oligoester acrylate, polyethylene glycol, phenylbis (2,4,6-ptrimethylbenzoyl) phosphine oxide, benzoyl peroxide, and ferric chloride×$7H_2O$ are commercially available products which can be obtained from various chemical manufacturers in USA, China, Russia, etc., they can also be prepared in laboratory conditions.

Thus, the oligoester acrylate can be produced by reversible condensation-type telomerization by introducing into condensation, along with dior polyfunctional reagents (alcohols and carboxylic acids), chain-growth regulators known as telogens. The latter contain a group that takes part in the condensation and a polymerizable group which does not participate in the condensation. Telogenic are acrylic acid series and their monoesters with dioxy compounds.

Synthesis of PEG is carried out by adding a precalculated amount of ethylene oxide to water or glycols in the presence of acidic or basic catalysts. The use of glycols as starting substances is preferable because it allows to obtain a PEG with a narrow molecular weight distribution (low polydispersity), i.e., variation of the lengths of individual polymer chains occurs in a small interval.

The polymerization takes place by ionic (anionic or cationic) mechanism. The use of anionic polymerization is more preferably because it allows to control the polydispersity of the final product. It should be noted that the ethylene oxide is polymerized with generation of heat and so that under certain conditions the reaction is able to accelerate uncontrollably, which can lead to an explosion.

The main method of synthesis of high molecular weight polymers of ethylene oxide is suspension polymerization. During the entire period of polymerization the growing polymer macromolecules need to be refrained from coagulation of the suspension. The process is catalyzed by magnesium-aluminum, or organic calcium compounds in the presence of chelating agents to prevent aggregation of polymer particles during the synthesis.

Catalysts for the synthesis of low molecular weight polyethylene glycols are alkali NaOH and KOH, as well as ash $Na_2CO_3$. The molecular weight of the polymer in this case is defined by the initial ethylene glycol and ethylene oxide as the polymerization proceeds without opening of the circuit.

The phenylbis (2,4,6-ptrimethylbenzoyl) phosphine oxide cannot be easily produced in laboratory conditions and therefore is recommended for purchasing from commercial producers.

The benzoyl peroxide can be prepared by reacting benzoyl chloride with hydrogen peroxide in an aqueous alkaline medium under stirring and cooling conditions. The process is conducted in continuous circulation of the reaction mixture through a reaction zone and a cooling zone. Circulation is performed for the liquid phase of the reaction mixture after separation from its solid phase by filtration. The apparatus for producing benzoyl peroxide comprises a reactor with a stirrer, water-cooling jacket, reagent feeder, circulation pump, refrigerator, and filter.

The ferric chloride×7H$_2$O can be prepared by acting with chlorine gas on the iron filings or a red-hot iron wire. At the same time, in contrast to the action of hydrochloric acid, a ferric salt is formed. In other words, a brown smoke consisting of fine particles of the ferric salt is emitted:

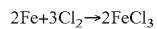

Also, trichloride is obtained by oxidation of iron chloride with chlorine (II):

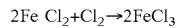

There is also a rather interesting method that consists of oxidation of sulfur with oxide (IV):

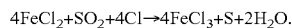

According to one aspect of the invention, the pasty basic polymer of the invention is prepared by the following method. First the components are mixed in the aforementioned proportions. The obtained solution is mixed, e.g., in a magnetic stirrer, for 1 to 6 hours. The solution is then irradiated by light, e.g., from UV LEDs, under constant stirring conditions until a gelatinous state is obtained. The photopolymer jelly is passed through a colloid mill in 4 stages with different nozzles. The obtained photopolymerized jelly is passed through a colloid mill with different nozzles.

According to another aspect of the invention, the pasty basic polymer can be obtained by mixing the components in the aforementioned proportions, stirring the obtained solution for 1 to 6 hours in a magnetic stirrer, and then subjecting a ⅓rd of the solution to UV radiation till a solid state. The obtained solid material is crushed in a mill till a powdered state. The remaining ⅔rd of the solution is subjected to UV curing under conditions of constant stirring until a uniform jelly is formed. The obtained photopolymerized jelly is mixed with the aforementioned powder unit a uniform mass is produced.

According to another aspect of the invention the pasty basic polymer of the invention can be colored by combining with 0.1 to 1 mass % of food-coloring agents. This allows obtaining of the composition in various colors such as red, blue, yellow, green, black, brown, pink, violet, etc. If the coloring agents are added in an amount less than 0.1 mass %, the color will be too dim (not sufficiently bright). On the other hand, if the coloring agent is added in an amount exceeding 1 mass %, this will noticeably delay the polymerization reaction.

Alternatively, the pasty basic polymer of the invention may be prepared with a property of changing color at various temperatures. For this purpose the pasty basic polymer is combined with reversible thermochromic dyes in an amount of 0.1 to 0.5 mass %. If the thermochromic dye is added in an amount of less than 0.1 mass %, the color will be too dim (not sufficiently bright). On the other hand, if the thermochromic coloring agent is added in an amount exceeding 0.5 mass %, this will noticeably delay the polymerization reaction.

As a result, it becomes possible to obtain objects of different colors, which will change when the temperature is changed. For example, at room temperature the object is red, but when it is blown by an air stream from a fan it changes color or becomes transparent, etc. When cooled, the object returns to its original color.

The pasty basic polymer of the invention may acquire magnetic properties by being mixed with 0.5 to 2 mass % of a ferromagnetic powder. If the ferromagnetic powder is added in an amount less than 0.05 mass %, the obtained object will have low magnetic properties, and if the content of the ferromagnetic powder exceeds 2%, this will noticeably delay the polymerization reaction.

Alternatively, mixing of the pasty basic polymer with a luminescent powder may impart to the polymer of the invention luminescent properties. Such a powder can be added in an amount of 1 to 5 mass %. If the luminescent powder is added in an amount less than 1 mass %, the obtained object will have low luminescent properties, and if the content of the luminescent powder exceeds 5%, this will noticeably delay the polymerization reaction.

Also, an addition of glitters will impart to the pasty basic polymer decorative glittering properties. This allows to obtain 3D objects with glittering inclusions of pink, blue, yellow, gold, silver, or another color. The glitters are added in an amount of from 1 to 5 mass %. If the glitters are added in an amount of less than 1 mass %, the decorative inclusions will be poorly visualized. If they are added in an amount exceeding 5 mass %, the polymerization reaction will significantly slow down.

Adding of aromatic agents will impart to the pasty basic polymer any desired smell (e.g., of watermelon, cantaloupe, whiskey, honey, ocean, pine, floral, and so on). The aromatic agents are added in an amount of from 5 to 9 wt. %. If the agents are added in an amount of less than 5%, the object will exude a faint smell. Addition of the aromatic agent in an amount exceeding 9 wt. %, will delay the polymerization reaction.

It is possible to obtain an electrically conductive polymer. For this purpose, the basic polymer is combined with a saturated solution of $CuNO_3$ or KI, or any other strong electrolyte in the matrix of hydroxyethylcellulose (1:1=electrolyte:hydroxyethylcellulose). A saturated solution of a strong electrolyte in a matrix of hydroxyethylcellulose ranges from 2% to 5 mass %. If the added saturated solution is added in an amount of less than 2 mass %, the obtained object or model will become almost non conductive. If, on the other hand, the added amount exceeds 5 mass %, this will noticeably delay the polymerization reaction.

The mass % content of all the compositions of the basic polymer depends on the amount of the added photoinitiators. If the content of the photoinitiators is less than 0.1 mass %, the polymerization reaction will delay. This delay occurs in a geometric progression to the decrease in the content of the initiators. If the content of the photoinitiators exceeds 1 mass %, the polymerization reaction also will delay but in arithmetic proportion to the increase of the initiator content.

APPLICATION EXAMPLES

The invention will be further described by way of application examples where all % contents are mass %. It is understood that the following examples do not limit the scope of application of the invention but can be modified within the scope of the appended patent claims.

Suitability of the composition for use in conjunction with the hand-held self-contained 3D printing device wherein the composition was contained in a cartridge from which it was extruded by a piston linearly moveable inside the cartridge, was evaluated by an ability of the extruded thread to maintain its shape without the use of support/supports. The cartridge volume was 10 ml. By replacing the cartridges, it was possible to change the output nozzle diameter in the range of 0.6 to 1.5 mm.

The environment temperature was 22° C. The composition was cured by irradiating it after extrusion at the exit from but inside the device by three LEDs having a total power of 2 Wt and emitting light having a wavelength in the range of 390 to 410 nm with the peak of power at a wavelength in the range of 407 to 408 nm. The extrusion rate of the composition at the exit was in the range of 0.55 to 0.5 cm/sec.

Application Example 1

A photopolymerizable paste was obtained by mixing 60% oligoester acrylate, 30% polyethylene glycol [PEG 600], 9% polyethylene glycol [PEG 4000], and 1% photoinitiators. The obtained photopolymerizable paste had viscosity of 7.05 $mm^2$/sec (a capillary method, Viscosimeter VPZh-2, the product of Labtex, Moscow, Russia). At the exit from the nozzle the composition could hold its shape without the use of supports.

Application Example 2

A photopolymerizable paste was obtained by mixing 80% oligoester acrylate, 10% polyethylene glycol [PEG 600], 9% polyethylene glycol [PEG 4000], and 1% photoinitiators. The obtained photopolymerizable paste had viscosity of 9.03 $mm^2$/sec (a capillary method, Viscosimeter VPZh-2, the product of Labtex, Moscow, Russia). At the exit from the nozzle the composition could hold its shape without supports only for a few seconds.

Application Example 3

A photopolymerizable paste was obtained by mixing 70% oligoester acrylate, 20% polyethylene glycol [PEG 600], 9% polyethylene glycol [PEG 4000], and 1% photoinitiators. The obtained photopolymerizable paste had viscosity of 8.55 $mm^2$/sec (a capillary method, Viscosimeter VPZh-2, the product of Labtex, Moscow, Russia); curing rate: 4.5 cm/sec. At the exit from the nozzle the composition could hold its shape without the use of supports.

Comparative Example 1

A photopolymerizable paste was obtained by mixing 50% oligoester acrylate, 45% polyethylene glycol [PEG 600], 4.5% polyethylene glycol [PEG 4000], and 0.5% photoinitiators. The obtained photopolymerizable paste had viscosity of 15.01 mm2/sec (a capillary method, Viscosimeter VPZh-2, the product of Labtex, Moscow, Russia). The substance was not sufficiently cured and began to flow directly after extrusion through the orifice of the nozzle.

Comparative Example 2

A photopolymerizable paste was obtained by mixing 90% oligoester acrylate, 8% polyethylene glycol [PEG 600], 1.8% polyethylene glycol [PEG 4000], and 0.2% photoinitiators. The obtained photopolymerizable paste had viscosity of 10.99 mm2/sec (a capillary method, Viscosimeter VPZh-2, the product of Labtex, Moscow, Russia). The substance was not sufficiently cured and began to flow directly after extrusion through the orifice of the nozzle.

Application Example 4

A photopolymerizable paste was obtained by mixing 80% oligoester acrylate, 10% polyethylene glycol [PEG 600], 8.5% polyethylene glycol [PEG 4000], 1% photoinitiators, and 0.5% of coloing agent. The obtained photopolymerizable paste was colored and had viscosity of 9.03 $mm^2$/sec (a capillary method, Viscosimeter VPZh-2, the product of Labtex, Moscow, Russia). At the exit from the nozzle the composition could hold its shape without the use of supports.

Application Example 5

A photopolymerizable paste was obtained by mixing 80% oligoester acrylate, 10% polyethylene glycol [PEG 600], 8.5% polyethylene glycol [PEG 4000], 1% photoinitiators, and 0.5% of thermochromic coloring agent. The obtained photopolymerizable paste could change color depending on the temperature of the environment and had viscosity of 9.03 $mm^2$/sec (a capillary method, Viscosimeter VPZh-2, the product of Labtex, Moscow, Russia). At the exit from the nozzle the composition could hold its shape without the use of supports.

Application Example 6

A photopolymerizable paste was obtained by mixing 80% oligoester acrylate, 10% polyethylene glycol [PEG 600], 8% polyethylene glycol [PEG 4000], 1% photoinitiators, and 1% of a magnetic ferro-powder. The obtained photopolymerizable paste acquired ability of magnetization and had viscosity of 9 mm²/sec (a capillary method, Viscosimeter VPZh-2, the product of Labtex, Moscow, Russia). At the exit from the nozzle the composition could hold its shape without the use of supports.

Application Example 7

A photopolymerizable paste was obtained by mixing 78% oligoester acrylate, 11% polyethylene glycol [PEG 600], 7% polyethylene glycol [PEG 4000], 1% photoinitiators, and 3% of a luminescent powder. The obtained photopolymerizable paste could glow in the dark and had viscosity of 9.15 mm²/sec (a capillary method, Viscosimeter VPZh-2, the product of Labtex, Moscow, Russia). At the exit from the nozzle the composition could hold its shape without the use of supports.

Application Example 8

A photopolymerizable paste was obtained by mixing 78% oligoester acrylate, 11% polyethylene glycol [PEG 600], 7% polyethylene glycol [PEG 4000], 1% photoinitiators, and 3% of a glittering powder. The photopolymerizable paste was obtained with blotches of the glittering agent and had viscosity of 9.12 mm²/sec (a capillary method, Viscosimeter VPZh-2, the product of Labtex, Moscow, Russia). At the exit from the nozzle the composition could hold its shape without the use of supports.

Application Example 9

A photopolymerizable paste was obtained by mixing 78% oligoester acrylate, 11% polyethylene glycol [PEG 600], 7% polyethylene glycol [PEG 4000], 1% photoinitiators, and 3% of a glittering powder. The photopolymerizable paste was obtained with blotches of the glittering agent and had viscosity of 9.12 mm²/sec (a capillary method, Viscosimeter VPZh-2, the product of Labtex, Moscow, Russia). At the exit from the nozzle the composition could hold its shape without the use of supports.

Application Example 10

A photopolymerizable paste was obtained by mixing 77% oligoester acrylate, 10% polyethylene glycol [PEG 600], 7% polyethylene glycol [PEG 4000], 1% photoinitiators, and 7% of an aromatic agent. The photopolymerizable paste was obtained with pleasant moderate flavor and had viscosity of 10.00 mm²/sec (a capillary method, Viscosimeter VPZh-2, the product of Labtex, Moscow, Russia). At the exit from the nozzle the composition could hold its shape without the use of supports.

Application Example 11

A photopolymerizable paste was obtained by mixing 78% oligoester acrylate, 11% polyethylene glycol [PEG 600], 7% polyethylene glycol [PEG 4000], 1% photoinitiators, and 3% of a saturated solution of a strong electrolyte in a hydroxyethylcellulose matrix. The photopolymerizable paste became electrically conductive and had viscosity of 11.01 mm²/sec (a capillary method, Viscosimeter VPZh-2, the product of Labtex, Moscow, Russia). At the exit from the nozzle the composition could hold its shape without the use of supports but lost this property after several minutes.

Although the invention has been described with reference to specific examples, any changes and modifications are possible within the scope of the attached patent claims. For example, the composition can be used in stationary 3D printers. In the initial state the composition may be in a solid, liquid, or a pasty state.

What is claimed is:

1. A composition for 3D printing comprising: 60 to 80 mass % of oligoester acrylate; 10 to 30 mass % of a liquid polyethylene glycol; 7 to 9 mass % of a non-liquid polyethylene glycol; and 0.1 to 1 mass % of a system of photopolymerization initiators, wherein the oligoester acrylate comprises a dimethacrylic ester of triethylelene glycol which is a non-toxic homogenous transparent liquid soluble in organic solvents and insoluble in water and wherein the oligoester acrylate is produced by condensation-type telomerization from methacrylic acid, triethylene glycol, and fluoroanhydride.

2. The composition according to claim 1, wherein the liquid polyethylene glycol comprises a liquid, which is non-volatile at room temperature and is selected from the group consisting of polyethylene glycols with molecular weights in the range of 200 to 600.

3. The composition according to claim 1, wherein the non-liquid polyethylene glycol is selected from the group of polyethylene glycols having a molecular weight in the range of 600 to 6000.

4. The composition according to claim 3, wherein the non-liquid polyethylene glycol with the molecular weight between 800 and 2000 is a pasty material and where the non-liquid polyethylene glycol with molecular weight above 3000 is a solid material.

5. The composition according to claim 1, wherein the polyethylene glycol is a non-liquid polyethylene glycol, which is selected from the group of polyethylene glycols having a molecular weight in the range of 600 to 6000.

6. The composition according to claim 5, wherein the non-liquid polyethylene glycol with the molecular weight between 800 and 2000 is a pasty material and where the non-liquid polyethylene glycol with molecular weight above 3000 is a solid material.

7. The composition according to claim 1, wherein the photopolymerization initiators are selected from the group consisting of phenylbis (2,4,6-trimethylbenzoyl) phosphine, benzoyl peroxide, ferric chloride×7$H_2O$, 2,2-dimethoxy-2-phenylacetophenone, benzoin methyl ether, benzoin butyl ether, benzophenone, acetophenone, 4,4-dichlorobenzophenone, diethoxyacetophenone, 1-hydroxycyclohexyl phenyl ketone, 2-isopropylthioxanthone, and oxide bis(2,6-dimethoxybenzoyl, 2,4,4-trimethylpentyl) phosphine.

8. The composition according to claim 7, wherein the oligoester acrylate comprises a dimethacrylic ester of triethylelene glycol which is a non-toxic homogenous transparent liquid soluble in organic solvents and insoluble in water.

9. The composition according to claim 7, wherein the liquid polyethylene glycol comprises a liquid, which is non-volatile at room temperature and is selected from the group consisting of polyethylene glycols with molecular weights in the range of 200 to 600.

10. The composition according to claim 9, wherein the non-liquid polyethylene glycol is selected from the group of polyethylene glycols having a molecular weight in the range of 600 to 6000.

11. The composition according to claim 10, wherein the non-liquid polyethylene glycol with the molecular weight between 800 and 2000 is a pasty material and where the non-liquid polyethylene glycol with molecular weight above 3000 is a solid material.

12. The composition according to claim 1, further comprising at least one additive selected from the group consisting of a food-coloring agent, a magnetic ferro-powder, a glittering agent, an aromatic agent, and an electrolyte.

13. The composition according to claim 4, further comprising at least one additive selected from the group consisting of a food-coloring agent, a magnetic ferro-powder, a glittering agent, an aromatic agent, and an electrolyte.

14. The composition according to claim 11, further comprising at least one additive selected from the group consisting of a food-coloring agent, a magnetic ferro-powder, a glittering agent, an aromatic agent, and an electrolyte.

15. The composition according to claim 1, wherein after being extruded at an environment temperature of 22° C. with the extrusion rate of 0.55 to 0.6 cm/sec through a nozzle of a hand-held 3D printing device having an output orifice with a diameter in the range of 0.6 to 1.5 mm and after being irradiated after extrusion with a light having a wavelength in the range of 390 to 408 nm by LEDs having a total power of 2 Wt, the composition maintained its shape without a support.

16. The composition according to claim 7, wherein after being extruded at an environment temperature of 22° C. with the extrusion rate of 0.55 to 0.6 cm/sec through a nozzle of a hand-held 3D printing device having an output orifice with a diameter in the range of 0.6 to 1.5 mm and after being irradiated after extrusion with a light having a wavelength in the range of 390 to 408 nm by LEDs having a total power of 2 Wt, the composition maintained its shape without a support.

17. The composition according to claim 11, wherein after being extruded at an environment temperature of 22° C. with the extrusion rate of 0.55 to 0.6 cm/sec through a nozzle of a hand-held 3D printing device having an output orifice with a diameter in the range of 0.6 to 1.5 mm and after being irradiated after extrusion with a light having a wavelength in the range of 390 to 408 nm by LEDs having a total power of 2 Wt, the composition maintained its shape without a support.

18. A composition for 3D printing comprising: 60 to 80 mass % of oligoester acrylate; 10 to 30 mass % of a liquid polyethylene glycol; 7 to 9 mass % of a non-liquid polyethylene glycol; and 0.1 to 1 mass % of a system of photopolymerization initiators, wherein the photopolymerization initiators are selected from the group consisting of phenylbis (2,4,6-trimethylbenzoyl) phosphine, benzoyl peroxide, ferric chloride×7$H_2$O, 2,2-dimethoxy-2-phenylacetophenone, benzoin methyl ether, benzoin butyl ether, benzophenone, acetophenone, 4,4-dichlorobenzophenone, diethoxyacetophenone, 1-hydroxycyclohexyl phenyl ketone, 2-isopropylthioxanthone, and oxide bis(2,6-dimethoxybenzoyl, 2,4,4-trimethylpentyl) phosphine, wherein the oligoester acrylate comprises a dimethacrylic ester of triethylelene glycol which is a non-toxic homogenous transparent liquid soluble in organic solvents and insoluble in water and wherein the oligoester acrylate is produced by condensation-type telomerization from methacrylic acid, triethylene glycol, and fluoroanhydride.

19. The composition according to claim 18, wherein the liquid polyethylene glycol comprises a liquid, which is non-volatile at room temperature and is selected from the group consisting of polyethylene glycols with molecular weights in the range of 200 to 600.

20. The composition according to claim 18, wherein the non-liquid polyethylene glycol is selected from the group of polyethylene glycols having a molecular weight in the range of 600 to 6000.

* * * * *